United States Patent
Andersson et al.

(10) Patent No.: US 8,412,842 B2
(45) Date of Patent: Apr. 2, 2013

(54) CONTROLLING STREAMING MEDIA RESPONSIVE TO PROXIMITY TO USER SELECTED DISPLAY ELEMENTS

(75) Inventors: Ola Andersson, Spanga (SE); Michael Huber, Sundbyberg (SE); Justus Petersson, Hasselby (SE); Robert Skog, Hasselby (SE); Johan Svedberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 287 days.

(21) Appl. No.: 12/973,590

(22) Filed: Dec. 20, 2010

(65) Prior Publication Data

US 2012/0050616 A1  Mar. 1, 2012

Related U.S. Application Data

(60) Provisional application No. 61/376,946, filed on Aug. 25, 2010.

(51) Int. Cl.
   *G06F 15/16* (2006.01)
(52) U.S. Cl. ............. 709/231; 709/220; 709/217; 707/3
(58) Field of Classification Search .................. 709/220, 709/217, 228, 231, 232
   See application file for complete search history.

(56) References Cited

U.S. PATENT DOCUMENTS

| | | | |
|---|---|---|---|
| 7,058,720 B1 * | 6/2006 | Majidimehr | 709/231 |
| 8,280,863 B2 * | 10/2012 | Pantos et al. | 707/693 |
| 2002/0196746 A1 | 12/2002 | Allen | |
| 2003/0197785 A1 | 10/2003 | White et al. | |
| 2008/0310445 A1 | 12/2008 | Bellwood et al. | |
| 2010/0040151 A1 | 2/2010 | Garrett | |
| 2011/0099195 A1 * | 4/2011 | Patwardhan et al. | 707/769 |
| 2012/0210216 A1 * | 8/2012 | Hurst | 715/716 |

OTHER PUBLICATIONS

International Search Report and Written Opinion of the International Searching Authority, PCT Application No. PCT/SE2011/050132, May 23, 2011.

* cited by examiner

*Primary Examiner* — Khanh Dinh
(74) *Attorney, Agent, or Firm* — Myers Bigel Sibley & Sajovec, P.A.

(57) ABSTRACT

Methods, electronic terminals, and systems are disclosed for controlling the display of video streams on an electronic terminal. A plurality of the video streams are received at the electronic terminal from the media server. The received video streams are displayed in an ordered set of elements on a display device of the electronic terminal. A user selection of at least a first one of the elements is received. Commands are communicated, responsive to the user selection, from the electronic terminal to the media server to control the quality of service of the video streams that are displayed in each of the non-selected elements in response to their respective location within the ordered set of elements relative to the selected first element.

14 Claims, 10 Drawing Sheets

CONTROLLING STREAMING MEDIA RESPONSIVE TO PROXIMITY TO USER SELECTED DISPLAY ELEMENTS

RELATED APPLICATIONS

The present application claims the benefit of priority from U.S. Provisional Application No. 61/376,946 entitled "Controlling Streaming Media Responsive to User Focus Areas" filed Aug. 25, 2010, the disclosure of which is hereby incorporated herein in its entirety by reference.

BACKGROUND

Electronic terminals have evolved to be capable of simultaneously displaying multiple video streams. One example is the picture-in-picture (PIP) feature that is available on many televisions. One channel may be displayed in a small area on the TV screen that is within a larger display area of another channel so that a user can simultaneously view video from two channels. More advanced devices enable more than two video streams to be simultaneously displayed, such as in a mosaic pattern that can include row and column arrangement of video display areas.

The communication bandwidth that is needed to support streaming video can quickly exceed a terminal's capability. Some video servers merge multiple channels into a mosaic pattern that is streamed as a single dedicated mosaic channel that can be broadcasted or communicated on-demand to terminals.

SUMMARY

Some embodiments of the present invention are directed to a method for controlling the display of video streams on an electronic terminal. A plurality of the video streams are received at the electronic terminal from a media server. The received video streams are displayed in an ordered set of elements on a display device of the electronic terminal. A user selection of at least a first one of the elements is received. Commands are communicated, responsive to the user selection, from the electronic terminal to the media server to control the quality of service of the video streams that are displayed in each of the non-selected elements in response to their respective location within the ordered set of elements relative to the selected first element.

The amount of communication bandwidth and/or other quality of service parameters that are utilized to stream videos to the electronic terminal and the associated processing resources at the electronic terminal and the media server can thereby be regulated based on, for example, the proximity of each of the corresponding elements to a user selected element. The proximity of the elements to a user selected element may be indicative of the relative importance of each of the associated video streams to the user.

In some further embodiments, commands are communicated to the media server that request that the video stream associated with the selected first element be communicated with a higher quality of service relative to the quality of service at which video streams for at least some of the non-selected elements are communicated to the electronic terminal. The higher quality of service may be provided by communicating the video stream associated with the selected first element at a higher bandwidth. Alternatively, the higher quality of service may be provided by communicating the video stream associated with the selected first element with a greater number of lines per video frame, a greater video frame rate, a higher quality video coding algorithm, and/or higher quality video coding parameter settings relative to a number of lines per video frame, a video frame rate, a quality of video coding algorithm, and/or a quality of video coding parameter settings that are used to communicate video streams for at least some of the non-selected elements to the electronic terminal.

Some other embodiments are directed to an electronic terminal that displays video streams received from a media server. The electronic terminal includes a transceiver, a display device, and circuitry that receives a plurality of the video streams from a media server via the transceiver circuitry. The circuitry operates to display the received video streams in an ordered set of elements on the display device. The circuitry receives a user selection of at least a first one of the elements, and communicates commands to the media server, via the transceiver circuitry, that control quality of service of the video streams that are displayed in each of the non-selected elements responsive to their respective location within the ordered set of elements relative to the selected first element.

Some other embodiments are directed to a video distribution system that includes a media server and at least one electronic terminal. The media server outputs a plurality of video streams at quality of service levels that are controlled in response to received commands. The electronic terminal includes a transceiver, a display device, and circuitry that receives video streams from the media server via the transceiver circuitry. The circuitry operates to display the received video streams in an ordered set of elements on the display device. The circuitry receives a user selection of at least a first one of the elements, and communicates commands to the media server via the transceiver circuitry that control quality of service of the video streams that are displayed in each of the non-selected elements responsive to their respective location within the ordered set of elements relative to the selected first element.

Other methods, electronic terminals, and/or systems according to embodiments of the invention will be or become apparent to one with skill in the art upon review of the following drawings and detailed description. It is intended that all such additional methods, electronic terminals and/or systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings are included to provide a further understanding of various embodiments of the present invention and are incorporated in and constitute a part of this application. In the drawings.

DETAILED DESCRIPTION

Figure 1:
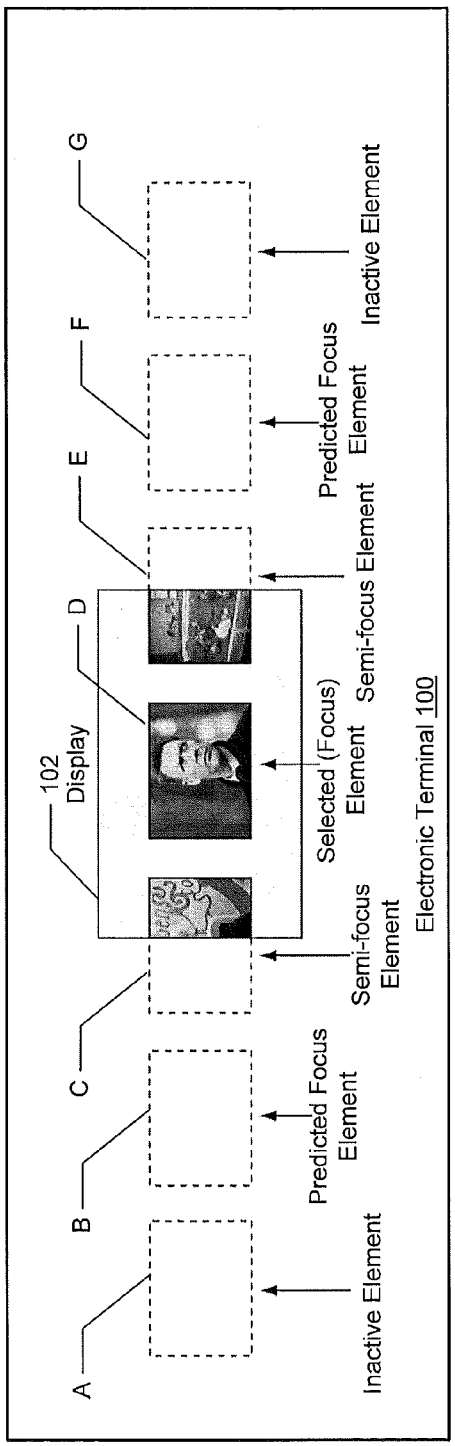
FIG. 1 is a block diagram illustrating an ordered sequence of video elements that a user can select among for display within a display area of a display device according to some embodiments.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Various embodiments of the present invention are directed to configuring electronic terminals, media servers, and/or network elements that control the Quality of Service (QoS) provided to a plurality of videos that are simultaneously streamed from a media server to a plurality of video elements (e.g., video display processes) in response to their proximity to one or more of the elements that have been selected by a user. Element(s) that are selected by a user (referred to as "selected element(s)" and "focus element(s)") can be allocated the highest quality of service for streaming video (e.g., highest bandwidth, delivered video quality, etc.), while other elements that are close to the selected element(s) can be allocated less quality of service for streaming video, and yet other element(s) that are still further away from the selected element(s) receive still lower or no allocated quality of service for streaming video.

The amount of communication bandwidth and/or other quality of service parameters that are utilized to stream videos to the electronic terminal and the associated processing resources at the electronic terminal and the media server can thereby be regulated based on, for example, the proximity of each of the corresponding elements to a user selected element. The proximity of the elements to a user selected element may be indicative of the relative importance of each of the associated video streams to the user.

Using predictive operations, a video stream that is associated with an element that is determined to be likely to have near-term user attention (e.g., located proximate to a selected element) may be initialized by various operations disclosed below to achieve a quicker increase in the quality of service at which the video stream associated with that element can be displayed at the increased quality of service (e.g., increased from not being displayed to being displayed) when the user selects that element or another element within a threshold distance of that element.

Although various embodiments are described in the context of controlling bandwidth of streaming video to a plurality of corresponding elements in response to their proximity to a selected element of the display, the invention is not limited thereto. For example, some other embodiments of the invention are directed to controlling delay, jitter, loss rate, and other communication metrics that can contribute to the user's perception of the quality of service of the delivered streaming media, and which can be carried out instead of or in addition to controlling bandwidth as described herein. Moreover, audio, text, and other types of media streams that can be associated with an ordered set of elements of an electronic terminal may be controlled responsive to their respective location within the ordered set of elements relative to a selected element in accordance with some embodiments.

As used herein, an electronic terminal can include any device that is configured to simultaneously receive a plurality of video streams and to control a quality of service of the communicated video streams. An electronic terminal can include, but is not limited to, a television, a television tuner (e.g., cable/satellite tuner) that is separate from a television/display device, a cellular communication terminal, and/or a desktop/laptop/palmtop computer that can receive video streams.

FIG. 1 is a block diagram illustrating a programmatically defined arrangement of video elements A-G that can be selected by a user for display on a display device 102 of an electronic terminal 100. Referring to FIG. 1, three video elements C, D, E are being simultaneously displayed on the display 102 for viewing by a user. Each of the video elements A-G can be programmatically associated to a different TV channel or other video source that can be streamed on-demand and/or broadcast from a media server to the electronic device. A user can control which of the video elements A-G are displayed by, for example, manipulating a user interface of the electronic device to scroll right and/or left through the arrangement, such as using a finger to swipe left/right across a touch sensitive element of the display 102 to scroll left/right through the sequence.

Element D is entirely within a viewable area of the display 102 and a user can select which of a plurality of video streams that are being received by the electronic terminal 100 from a media server are displayed in element D. Element D is therefore designated as a "selected (focus) element" because the user selects which video is displayed in that element and the user's attention is presumed to be primarily focused thereon. The adjacent elements C and E each extend partially outside the viewable area of the display 102 and, therefore, are each designated as a "semi-focus element" because less of the user's attention is presumed to be focused thereon. Located further away in the sequence from element D are elements B and F which are not displayed but which are predicted to be most likely among the non-displayed video elements to be next desired to be viewed by the user and, therefore, are each designated as a "predicted focus element." Video elements A and G are located still further away in the sequence from element D than the predicted focus elements B and F and, therefore, are each designated as "inactive elements."

Although the semi-focus elements C and E are illustrated in FIG. 1 as extending beyond the viewable area of the display 102, they are not limited thereto and, in some other embodiments, may be entirely within the viewable area of the display 102, such as will be explained below with regard to FIGS. 7 and 8, or no portion may be within the viewable area of the display 102. Similarly, although the predicted focus elements B and F and inactive elements A and G are illustrated in FIG. 1 as not being within the viewable area of the display 102, they are not limited thereto and, in some other embodiments, may be partially or wholly within the viewable area of the display 102 such as will be also explained below with regard to FIGS. 7 and 8.

Figure 2:
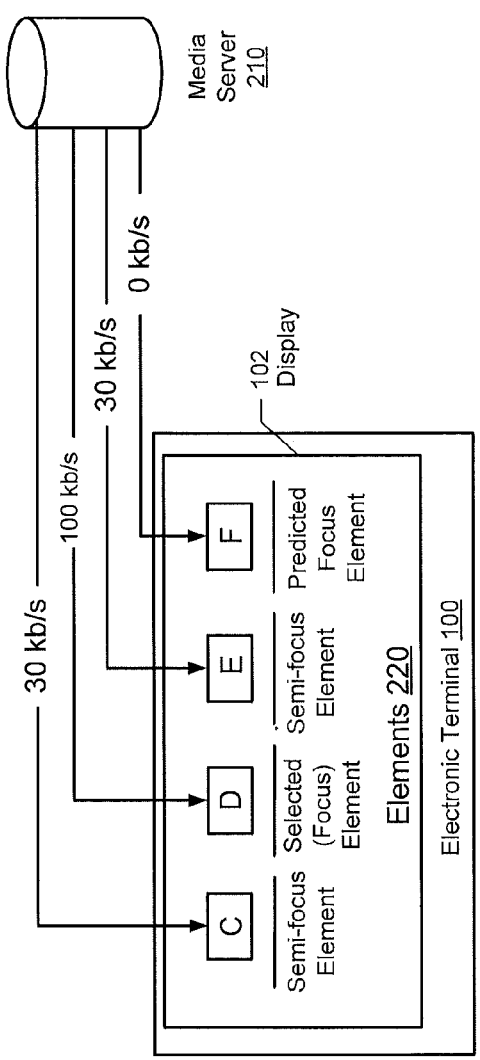
FIG. 2 is a block diagram of a media server that is streaming video for the video elements that are displayed on the display device of FIG. 1 according to some embodiments.

FIG. 2 is a block diagram of a media server 210 that streams video to elements 220 that are associated with the display device 102 according to some embodiment. Referring to FIGS. 1 and 2, the highest communication bandwidth (e.g., 100 kb/s) is allocated to the video stream associated with focus element D. Less communication bandwidth (e.g., 30 kb/s) is allocated to the video streams associated with each of the semi-focus elements C and E. Still less communication bandwidth than is allocated for the video streams associated with predicted-focus elements B and F or, alternatively, no communication bandwidth (e.g., 0 kb/s) is allocated to the video streams for each of the predicted focus elements B and F. Still less or no communication bandwidth (e.g., 0 kb/s) is allocated to the video streams associated with each of the inactive focus elements A and G. The Predicted focus element B and inactive focus elements A and G have been omitted from FIG. 2 for ease of illustration.

Accordingly, the video stream for focus element D can be allocated the highest relative communication bandwidth among the elements 220 to enable display of higher quality video thereon. Lower communication bandwidth is allocated to the semi-focus elements C and E which are only partially displayed on the display 102. Bandwidth of the various video streams may be controlled by, for example, regulating the number of displayed pixels/lines per video frame, the video frame rate, the type of video coding and/or other parameters used for the video coding (e.g., lossy compression rate), the type of symbol coding (e.g., QPSK (quadrature phase-shift keying), 16QAM (quadrature amplitude modulation), etc.) used for data communication, and/or the coding rate (e.g., 1/2, 2/3, 4/5, etc.) used for data communication. Thus, for example, the video stream that is displayed in focus element D may have a greater number of displayed pixels/lines per video frame, higher video frame rate, higher quality video coding algorithm and/or higher quality video coding parameter settings, and/or more robust symbol coding and/or coding rate relative to the video streams that are displayed in the semi-focus elements C and E.

Although in some embodiments the video streams associated with the predicted focus elements B and F may be allocated less bandwidth (or no bandwidth) relative to the semi-focused elements C and E, the video streams associated with the predicted focus elements B and F are next closest in the arrangement to the focus element D, after semi-focus elements C and F, and therefore are the most likely video streams that will be controlled by a user (e.g., scrolling command) to shifted over to become associated with a semi-focused element or the focused element. When the video streams for the predicted focus elements B and F are allocated bandwidth, the video streams may be primarily maintained in a paused state, such as with video frames being ready but not sent from the media server 210 to the electronic terminal 100, in order to reduce the communication resources allocated thereto and to minimize/reduce their use of video decoder resources. When the predicted focus elements B and F are viewable on the display 102, the associated video streams may be allocated a sufficient bandwidth to support a very slow video frame rate to display repetitively (e.g., periodically) changing frame snapshot still images.

When the video streams for the predicted focus elements B and F are active but paused, the decoder within the electronic terminal can be at least partially initialized so that the predicted focus elements B and F can be transitioned to become semi-focused elements or focused elements with a substantially decreased video startup time. Initialization of the decoder for decoding of video streams for the predicted focus elements B and F may include, but is not limited to, allocating address space within a video memory for use in decoding the video steams, selecting among a plurality of video decoder algorithms for use in decoding the video steams, and/or setting parameters that are used by a selected video decoder algorithm for use in decoding the video streams.

Figure 3:
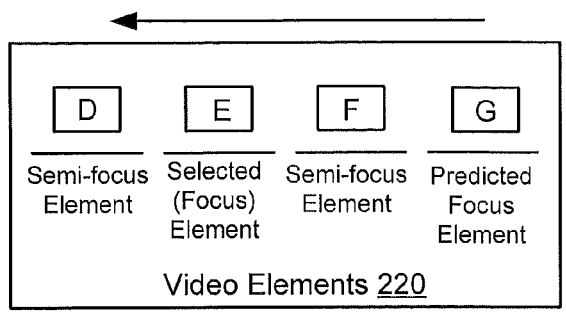
FIG. 3 is a block diagram of the video elements of FIG. 1 that have been shifted by a user to the left relative to the display according to some embodiments.

FIG. 3 is a block diagram of the video streams of FIG. 1 that have been shifted by a user to the left (e.g., scrolled left) relative to the display 102 according to some embodiments. Referring to FIG. 3, the video streams have been shifted between element designations as follows: the video stream associated with element D has shifted from a focus element to a semi-focus element; the video stream associated with element E has shifted from a semi-focus element to a focus element; the video stream associated with element F has shifted from a predicted focus element to a semi-focus element; the video stream associated with element G has shifted from an inactive element to a predicted focus element; and the video stream associated with element C has shifted from a semi-focus element to a predicted focus element. Thus, for example, the video streams associated with elements D and F may extend beyond the viewable area of the display 102 while the video stream associated with element E may be entirely within the viewable areas of the display 102.

Figure 4:
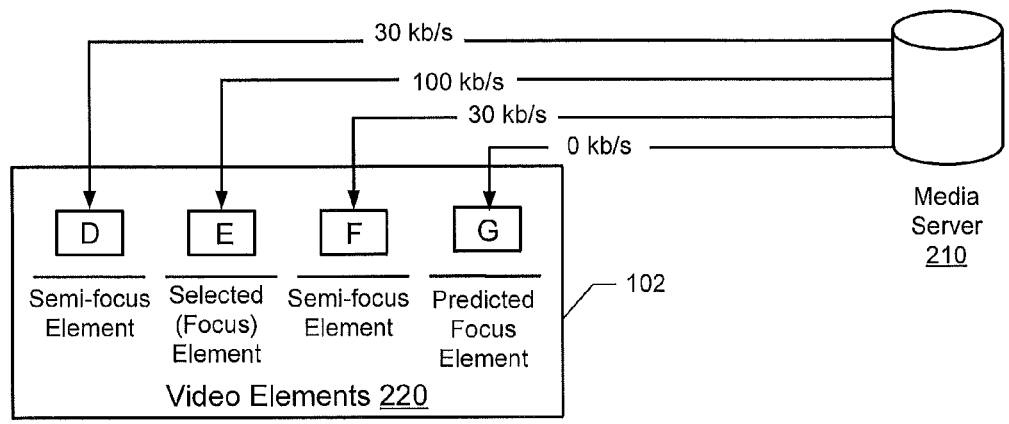
FIG. 4 is a block diagram of the media server streaming video for the video elements being displayed in FIG. 3 according to some embodiments.
Figure 5:
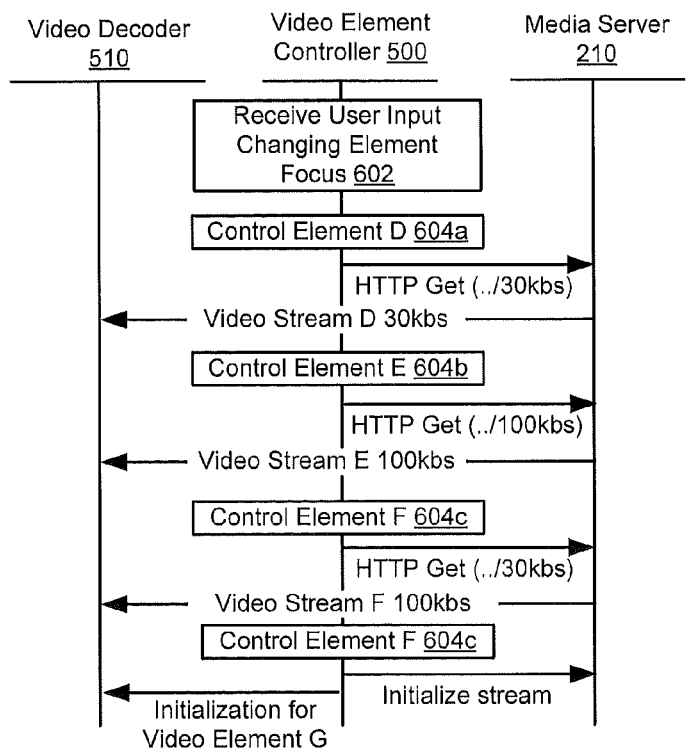
FIG. 5 is a data flow diagram of exemplary operations and methods that may be carried out to control video streams from the media server responsive to the change from the configuration of FIG. 2 to that of FIG. 4 according to some embodiments.
Figure 6:
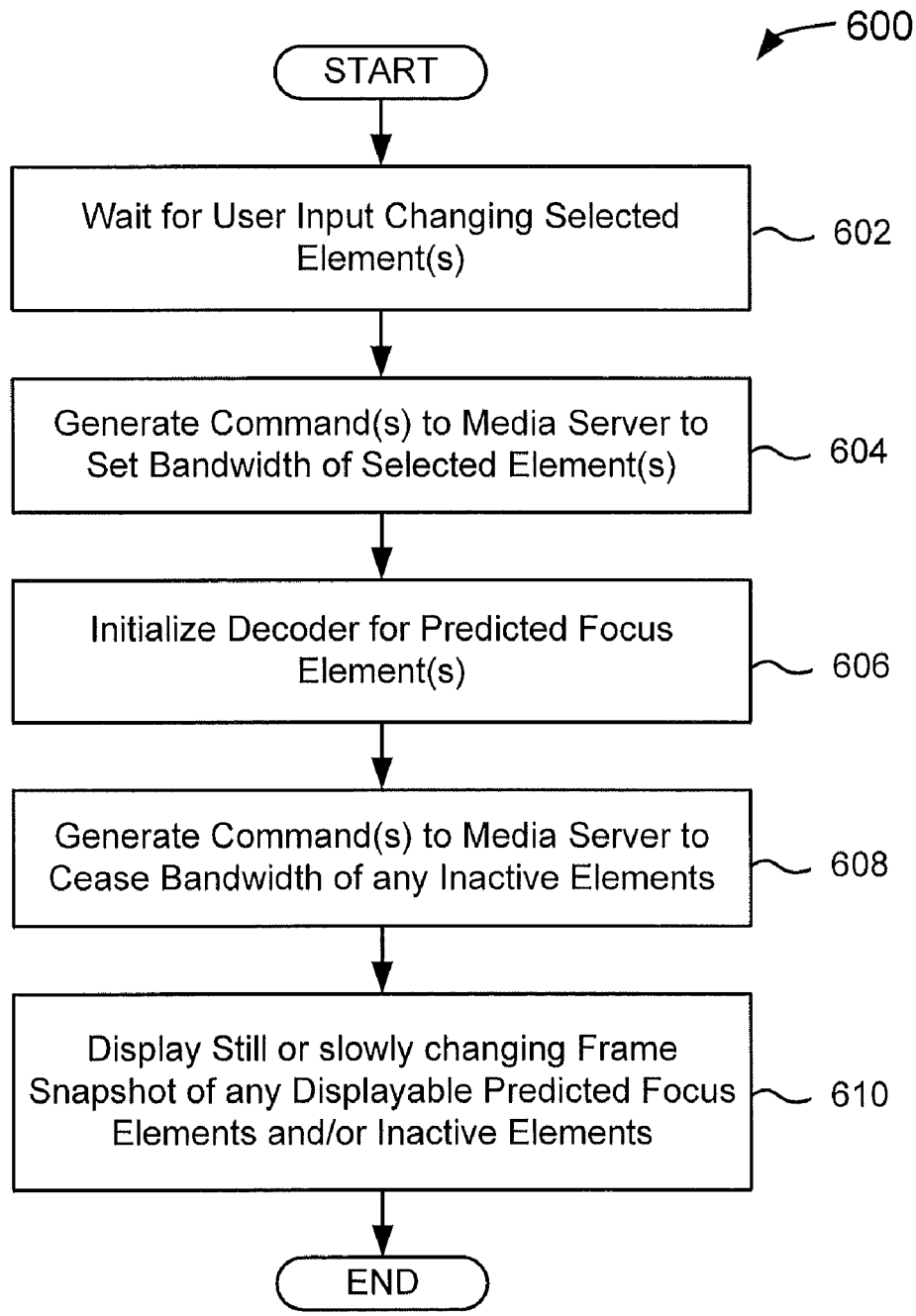
FIG. 6 is a flowchart of exemplary operations and methods that may be carried out by the electronic terminal to control the video streams from the media server responsive to user input changing selected elements according to some embodiments.

The bandwidth that is allocated to the corresponding video streams is controlled responsive to the changes in the element designations. FIG. 4 is a block diagram of the media server 210 streaming video for the video elements D, E, F according to some embodiments. FIG. 5 is a data flow diagram of exemplary operations and methods that may be carried out by a video element controller 500 and a video decoder 510, both within the electronic terminal 100, and by the media server 210 to control the flow of video streams responsive to the change from the configuration of FIG. 2 to that of FIG. 4 according to some embodiments of the present invention. FIG. 6 is a flowchart of exemplary operations and methods 600 that may be carried out by the video element controller 500 according to some embodiments of the present invention.

Referring to FIGS. 4, 5, and 6, in response to receiving (Block 602) a command from a user that triggers a change in quality of service to be provided for one or more video streams associated with one or more elements, the video element controller 500 generates commands to the media server 210 to set (Block 604) the bandwidth for the associated element(s). The user command may, for example, be generated in response to a user touch selecting the video stream associated with element E. As shown in FIG. 5, the video element controller 500 can respond by shifting associations of the video streams to the video elements one sequence location to the left, and by generating commands that regulate HTTP adaptive streaming functionality in the media server 210, although commands according to other protocols may alternatively or additionally be used to regulate bandwidth.

For example, the video element controller 500 can respond to the video stream associated with element D shifting from a focus element to a semi-focus element by generating (Block 604*a*) a HTTP Get command to the media server 210 requesting that the identified video stream be supplied at 30 kb/s (which is decreased from the previous 100 kb/s rate). Similarly, the video element controller 500 can respond to the video stream associated with element E shifting from a semi-focus element to a focus element by generating (Block 604*b*) another HTTP Get command to the media server 210 requesting that the identified video stream be supplied at 100 kb/s (which is increased from the previous 30 kb/s rate). Similarly, the video element controller 500 can respond to the video stream associated with element F shifting from a predicted focus element to a semi-focus element by generating (Block 604*c*) another HTTP Get command to the media server 210 requesting that the identified video stream be supplied at 30 kb/s (which is increased from the previous 0 kb/s rate). The media server 210 responds to the commands by supplying the identified video streams D, E, F at the identified bit rates.

The video element controller 500 may respond to the video stream associated with element G becoming a predicted focus element by at least partially initializing (Block 606) the video decoder 510 so that the video stream associated with the predicted focus element F can be shifted to a semi-focused element or to a focused element with a decreased video startup time. As explained above, initialization of the decoder 510 may include, but is not limited to, allocating address space within a video memory for use in decoding the video steam for element F, selecting among a plurality of video decoder algorithms for use in decoding the video steam for element F, and/or setting parameters that are used by a selected video decoder algorithm for use in decoding the video steam for element F. The initialization may alternatively or additionally include triggering the media server 210 to startup the associated video stream, such as by generating a low frame rate video stream that can be used to initialize the decoder 510 and/or to start-up and pause the associated video stream.

The video element controller 500 may also generate commands (Block 608) to the media server 210 to cease video streams that are associated with any now inactivated elements. The controller 500 may display (Block 610) still or slowly changing video frame snapshots or other defined indicia for displayable predicted focus elements and/or inactive elements.

Figure 7:
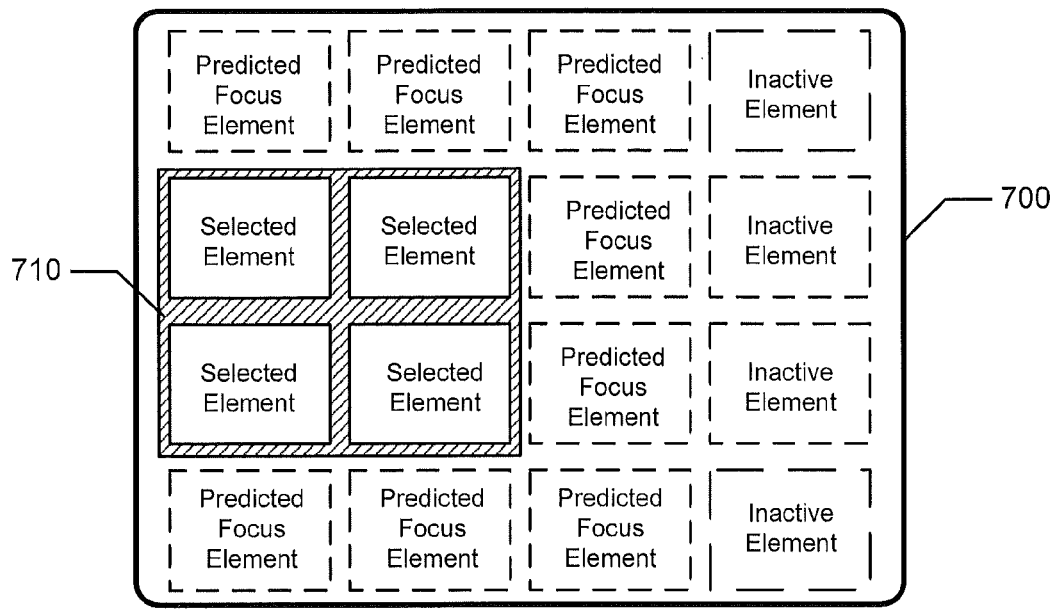
FIG. 7 is a block diagram of an exemplary mosaic arrangement of video elements that are displayed on a display device with user controllability of prioritization of associated video streams according to some embodiments.

FIG. 7 is a block diagram of an exemplary mosaic arrangement of video elements that are displayed on a display device of an electronic terminal 700. The electronic terminal 700, which may include the video element controller 500, the video decoder 510, and the media server 210 of FIGS. 5 and 6, is configured to allow a user to control the quality of service that is provided to video streams associated with the displayed video elements according to some embodiments of the present invention. Referring to FIG. 7, a plurality of video elements are displayed in an arrangement of rows and columns. A selection box 710 is displayed on the display device and defines an area where the user desires that a highest quality of service be provided to any elements that are wholly displayed within boundaries of the background box 710. Accordingly, as shown in FIG. 7, four elements that are entirely within the boundaries of the background box 710 are defined as selected elements and are allocated the highest level of bandwidth for their associated video streams compared to the other elements. The next closest elements are outside the selection box 710 and designated as predicted focus elements. The video streams that are supplied to the predicted focus elements may be allocated a lower quality of service to provide a slower frame rate, may use a lower number of pixels/lines/sharpness, and/or may use a lower quality video encoder and/or lower quality video encoding, or they may be allocated no bandwidth but the video decoder 510 may be at least partially initialized as explained above. The more distant located elements are designated as inactive elements and may be allocated no bandwidth for their associated video streams and, instead, a still image or other indicia may be displayed at their locations.

Figure 8:
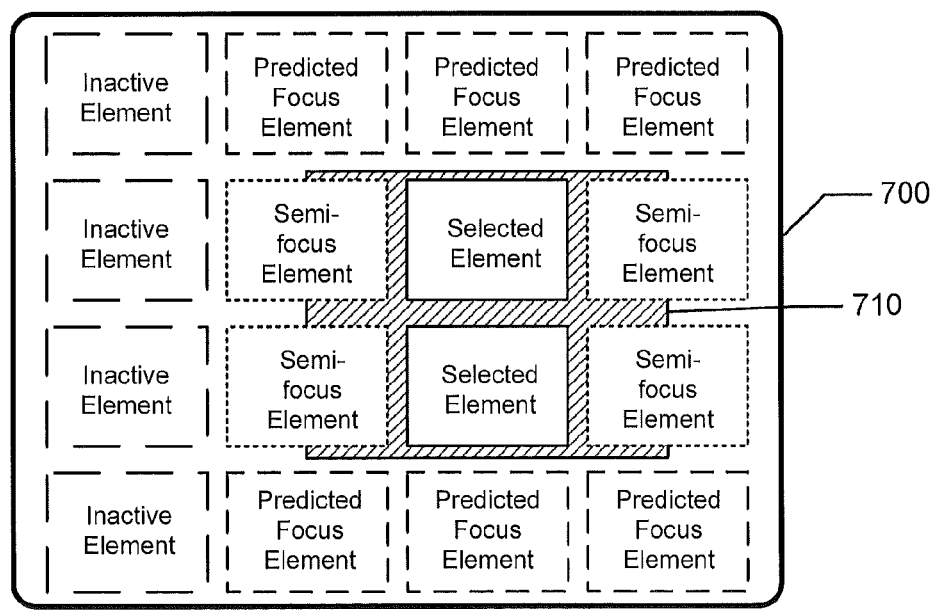
FIG. 8 is a block diagram of the exemplary mosaic arrangement of FIG. 7 with a different user prioritization of video streams according to some embodiments.

FIG. 8 is a block diagram of the exemplary mosaic arrangement of FIG. 7 with the selection box 710 slid to the right. Referring to FIG. 8, the two predicted focus elements that are on the right of box 710 of FIG. 7 are now wholly within the box 710 of FIG. 8 and, therefore, are now designated as focus elements. Similarly, the two focus elements on the left of box 710 of FIG. 7 are now outside of box 710 of FIG. 8 and, therefore, are now designated as inactive elements. Four semi-focus elements have also been newly designated in response to their being at least partially within the box 710. The bandwidth that is allocated to video streams supplied to the elements is controlled in response to the presently defined designations shown in FIG. 8. Accordingly, the highest bandwidth is allocated to the video streams for the focus elements and the lowest bandwidth/no bandwidth is allocated to video streams associated with the inactive elements.

Accordingly, a user may drag/move the box 710 around the display to change the quality of service that is allocated to the video streams for the displayed elements. The elements that are entirely within the box 710 are provide the highest video stream quality, elements that are only partially within the box 710 are provided lower video stream quality, and the quality of video that may is supplied to the other elements is similarly controlled in response to their proximity to the box 710. The amount of communication bandwidth that is utilized to stream the video streams to the electronic terminal and the associated processing resources of the electronic terminal can thereby be regulated based on where the user's indicated focus area is on the display 700.

Figure 9:
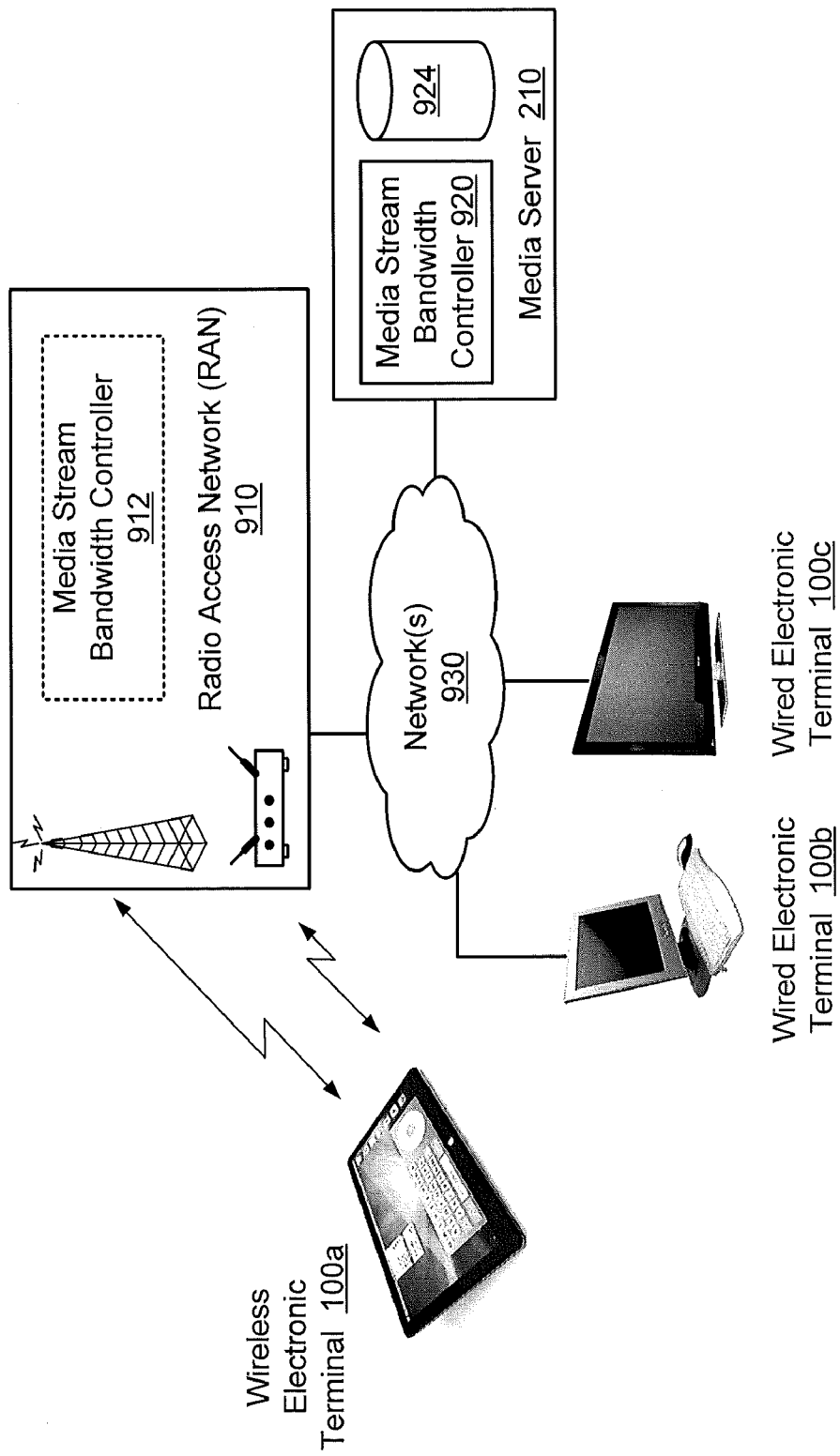
FIG. 9 is a block diagram of an exemplary system that includes a plurality of electronic terminals, a radio access network, and a media server that are configured according to some embodiments.

FIG. 9 is a block diagram of an exemplary system that includes a plurality of electronic terminals 100*a*, 100*b*, 100*c* (which may each correspond to the electronic terminal 100 of FIGS. 1-8), a radio access network 910, and a media server 210 that are configured according to some embodiments of the present invention. The media server 210 can include a media stream bandwidth controller 922 and a repository 924 (e.g., mass data storage device) of videos or other media that can be streamed through a network 930 to one or more of the terminals 100*a*, 100*b*, 100*c*. The bandwidth controller 922 is configured to regulate the bandwidth or other parameters that affect the quality of service of media that is streamed from the repository 924 to one or more of the terminals 100*a*, 100*b*, 100*c* in response to the designations of the associated element (e.g., focus element, semi-focus element, predicted focus element, and inactive element), which is responsive to user selections among the elements, as explained herein. The network 930 may include public networks (e.g., Internet) and/or private networks.

The wireless electronic terminal 100*a* is configured to communicate with the media server 210 through the radio access network (RAN) 910. The RAN 910 may contain one or more cellular radio access technology systems that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution). The RAN 910 may alternatively or additional communicate with the terminal 100*a* through a Wireless Local Area Network (i.e., IEEE 802.11).

The wired electronic terminals 100*b* and 100*c* may include, but are not limited to, a desktop/laptop/palmtop computer, a television, and/or broadcast television tuner (e.g., cable/satellite tuner) that may be configured to communicate with the media server 210 through a wired connection (e.g., cable/digital subscriber line/etc.) to the network 930.

Although various embodiments have been described in the context of the media stream bandwidth controller 920 being entirely within the media server 210 and controlling streaming video bandwidth, some or all of the above-described bandwidth control functionality may be, at least in part, carried-out by circuitry that is located in other components, such as within the RAN 910. Accordingly, the term "media server" is defined herein to include circuitry that outputs video streams, such as from a media repository, to electronic terminals and to further include circuitry that controls the bandwidth and/or other quality of service parameters associated with those video streams responsive to commands received from the electronic terminals, irrespective of where in the system that circuitry is located. Thus, the term media server includes the media stream bandwidth controller 920 that may be located near the repository 924 and can include the more remotely located media stream bandwidth controller 912 that may at least partially reside within the RAN 910.

For example, the RAN 910 may include a media stream bandwidth controller 912 that is configured to regulate the bandwidth or other parameters that affect quality of service of videos that are streamed from the repository 924 to one or more of the terminals 100*a*, 100*b*, 100*c* in response to the designations of the associated elements. In some embodiments, the media server 210 may output all video streams to the RAN 910 using the same bandwidth. The controller 912 may then regulate what particular bandwidth is allocated to various ones of the video streams in response to what designations are presently attributed to the associated elements (e.g., focus element, semi-focus element, predicted focus element, and inactive element). Thus, the controller 912 may assign the highest relative bandwidth for communication across a wireless interface to one of more of the wireless terminal 100*a*, 100*b*, 100*c* for video streams associated with focus elements and assign respective lower bandwidth levels down to, for example 0 kb/s, for communication of semi-focus element, predicted focus element, and inactive elements as explained above.

The controller 912 may control the bandwidth that is used to communicate various ones of the video streams by controlling the video frame rate, controlling the number of pixels/lines per video frame, selecting among a plurality of video coding algorithms to code the video and which output different data rates, select parameters for video coding (e.g., lossy compression rate) that provide a fuzzier/sharper or otherwise lower/higher quality video stream at different data rates, and/or select symbol coding (e.g., QPSK (quadrature phase-shift keying), 16QAM (quadrature amplitude modulation), 64 QAM, etc.) and/or the coding rate (e.g., 1/2, 2/3, 4/5, etc.) that provides a defined coding rate.

Figure 10:
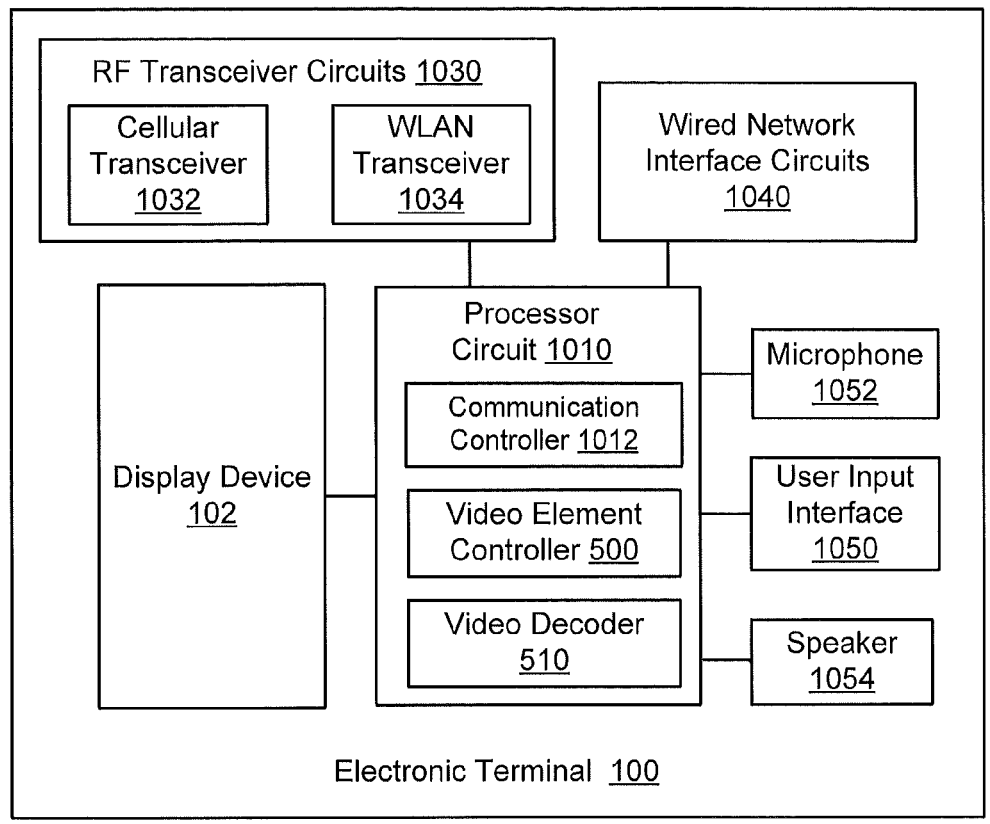
FIG. 10 is a block diagram of an exemplary electronic terminal that is configured according to some embodiments.

FIG. 10 is a block diagram of an example electronic terminal 100 that is configured according to some embodiments of the present invention. The electronic terminal 100 can include a processor circuit 1010, a display device 102, and communication circuits, such as RF transceiver circuits 1030 and/or wired network interface circuits 1040 (e.g., digital cable and/or digital subscriber line interface circuits). The RF transceiver circuits 1030 may include a cellular transceiver 1032 and/or a WLAN transceiver 1034 (i.e., IEEE 802.11). The cellular transceiver 1032 may operate according to a cellular radio access technology that may include, but is not limited to, GSM, GPRS, EDGE, DCS, PDC, PCS, CDMA, wideband-CDMA, CDMA2000, UMTS, and/or 3GPP LTE.

The RF transceiver circuits 1030 may be configured to receive a plurality of media streams from the media server 210 via the network(s) 930 and the RAN 910 shown in FIG. 9. The wired network interface circuits 1040 may be configured to receive the media streams from the media server 210 directly from the network(s) 930. The display device 102 may be configured to display one or more video streams, such as by the methods and operations described herein. The processor circuit 1010 may include one or more data processing and memory circuits, such as a general purpose and/or special purpose processor (e.g., microprocessor and/or digital signal processor) with on-board and/or separate memory devices. The processor 1010 is configured to execute computer program instructions from a memory device, described below as a computer readable medium, to form: a communication controller 1012 that manages communications between the electronic terminal 100 and the media server 210; a video element controller 500 that may be configured to operate as described herein with regard to the methods and operations of FIGS. 1-17; and a video decoder that may be configured to operate as described above with regard to the methods and operations of FIGS. 1-17.

The terminal 1000 may further include a microphone 1052, a user input interface 1050 (e.g., touch sensitive interface associate with the display device 102, a keypad, a keyboard, buttons, joystick, or other apparatus configured to sense user inputted commands), and a speaker 1054 that can be configured to output any audio portion of one or more received media streams.

Figure 11:
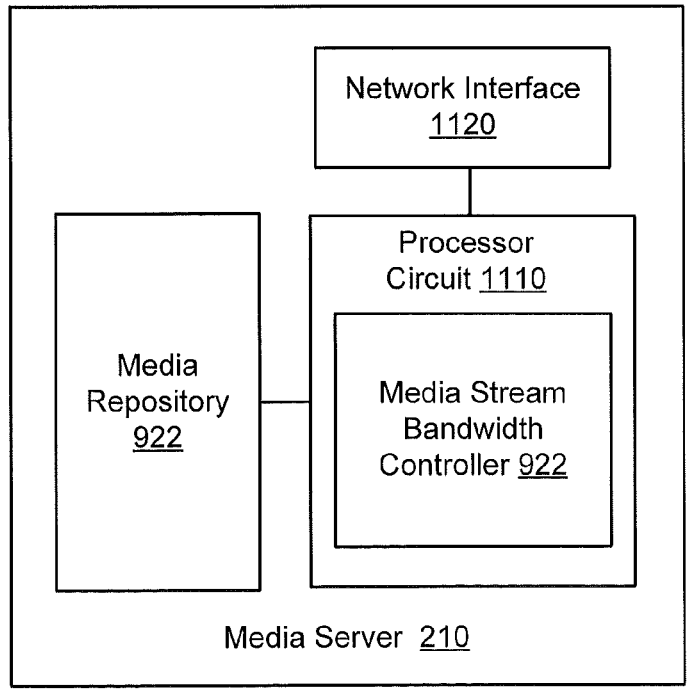
FIG. 11 is a block diagram of an exemplary media server that is configured according to some embodiments.

FIG. 11 is a further block diagram of the exemplary media server 210 shown in FIG. 9. The media server 210 can include the media repository 924, a processor circuit 1110, and a network interface 1120. The media repository 924 may include a relational database having a mass storage device, such as one or more disk drives and/or semiconductor memory, that contain a plurality of media files that can be streamed to remote terminals (e.g., client devices). The media repository 924 may be omitted in some embodiments, such as when the video is received from another networked device.

The processor circuit 1110 may include one or more data processing and memory circuits, such as a general purpose and/or special purpose processor (e.g., microprocessor and/or digital signal processor) with on-board and/or separate memory devices. The processor 1110 is configured to execute computer program instructions from a memory device, described below as a computer readable medium, to form the media stream bandwidth controller 922 and may be configured to operate as described herein with regard to FIGS. 1-17. The network interface 1120 is configured to simultaneously communicate a plurality of media streams to one or more electronic terminals through the network 930, and may further communicate through the RAN 910 to one or more wireless terminals.

FIGS. 12-17 are flowcharts of more general operations and methods that may be carried out by the electronic terminal 100 in combination with the media server 210 to control video streams that are output by the media server 210 responsive to selections by a user in accordance with various embodiments of the present invention.

Figure 12:
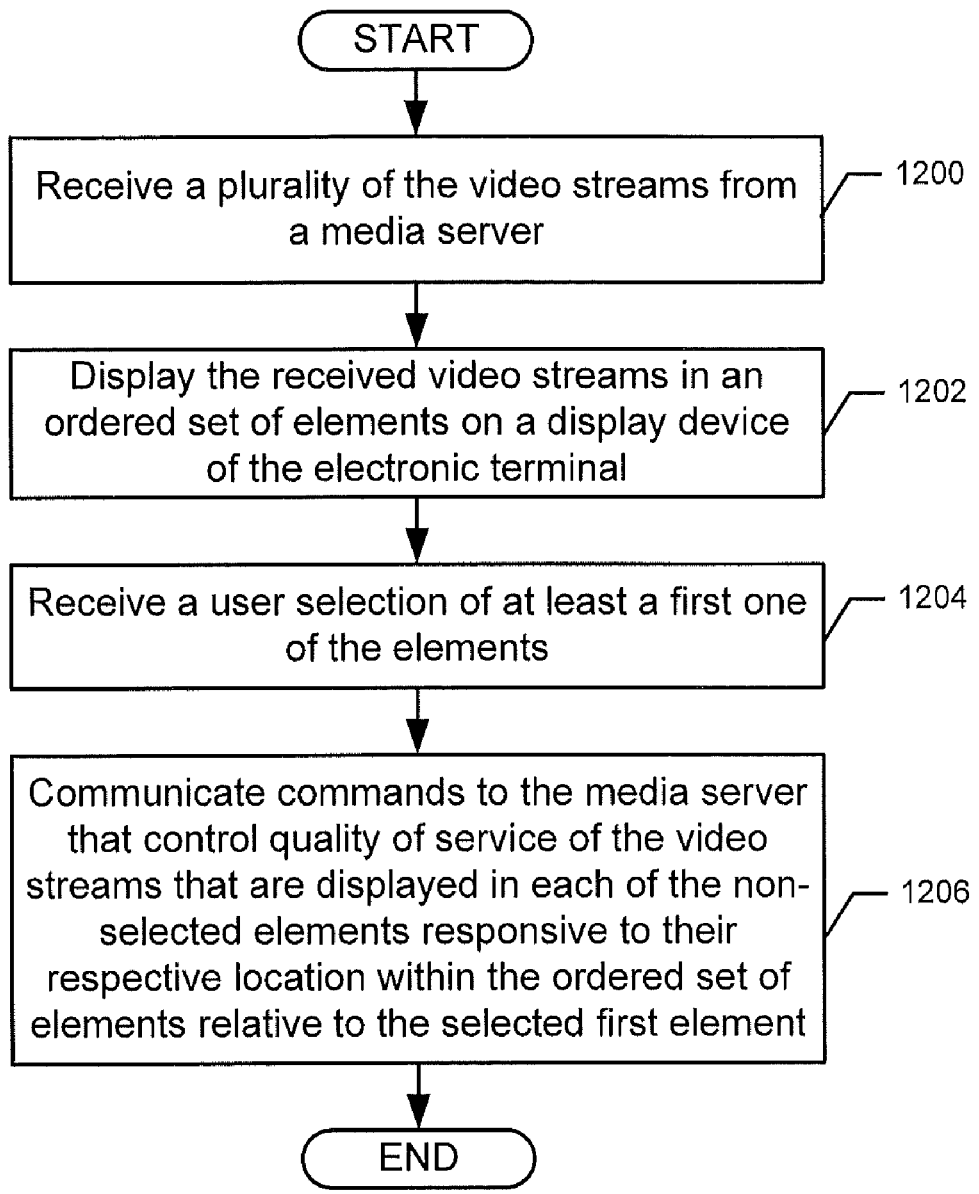
FIGS. 12-17 are flowcharts of exemplary operations and methods that may be carried out by an electronic terminal in combination with a media server to control video streams that are output by the media server responsive to selections by a user according to some embodiments.

Referring to FIG. 12, a method is illustrated for controlling display of video streams on the electronic terminal 100. A plurality of the video streams are received (block 1200) at the electronic terminal 100 from the media server 210. The received video streams are displayed (block 1202) in an ordered set of elements on the display device 102 of the electronic terminal 100. A user selection of at least a first one of the elements is received (block 1204). In response to the user selection, commands are communicated (block 1206) from the electronic terminal 100 to the media server 210 that control quality of service of the video streams that are received and displayed in each of the non-selected elements responsive to their respective location within the ordered set of elements relative to the selected first element.

Figure 13:
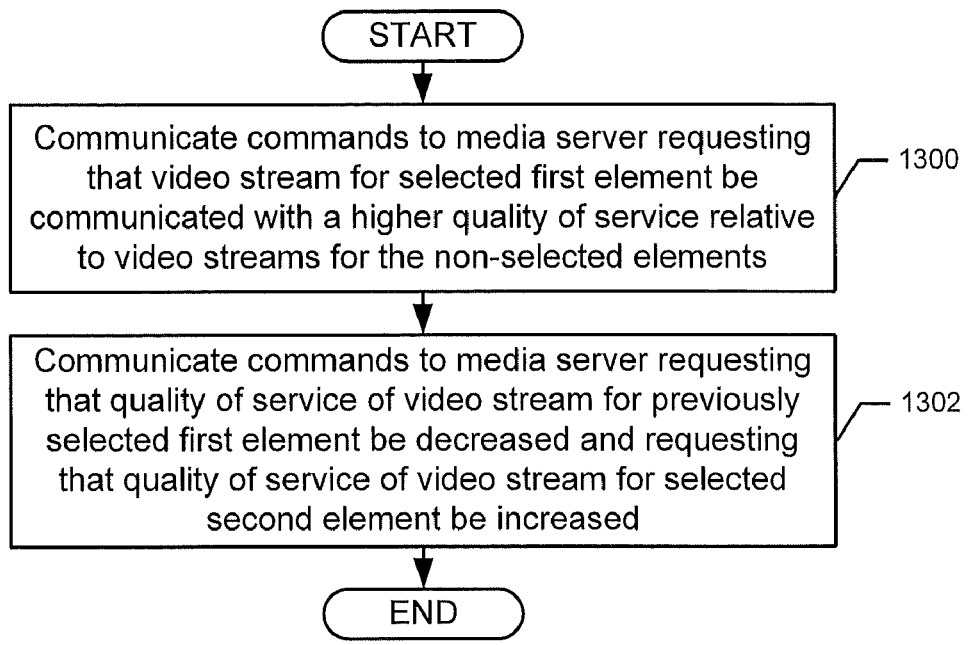

FIG. 13 illustrates a further method that may be carried out when communicating the commands in block 1206 of FIG. 12. Referring to FIG. 13, commands are communicated (1300) to the media server 210 requesting that the video stream associated with the selected first element be communicated with a higher quality of service relative to quality of service at which video streams for at least some of the non-selected elements are communicated to the electronic terminal 100. Further commands are communicated (1302) to the media server 210 requesting that the video stream associated with the selected first element be communicated with a higher bandwidth relative to bandwidth at which video streams for at least some of the non-selected elements are communicated to the electronic terminal 100.

The communicated commands may request that the video stream associated with the selected first element be communicated with a greater number of lines per video frame, a greater video frame rate, a higher quality video coding algorithm, and/or higher quality video coding parameter settings relative to a number of lines per video frame, a video frame rate, a quality of video coding algorithm, and/or a quality of video coding parameter settings that are used to communicate video streams for at least some of the non-selected elements to the electronic terminal 100.

A user selection of at least a second one of the elements may be received and, responsive thereto, commands can be communicated to the media server 210 requesting that the quality of service at which the video stream associated with the previously selected first element be decreased to a level of at least some of the non-selected elements and requesting that the quality of service at which the video stream associated with the selected second element be increased above the decreased quality of service of the video stream associated with the previously selected first element.

Figure 14:
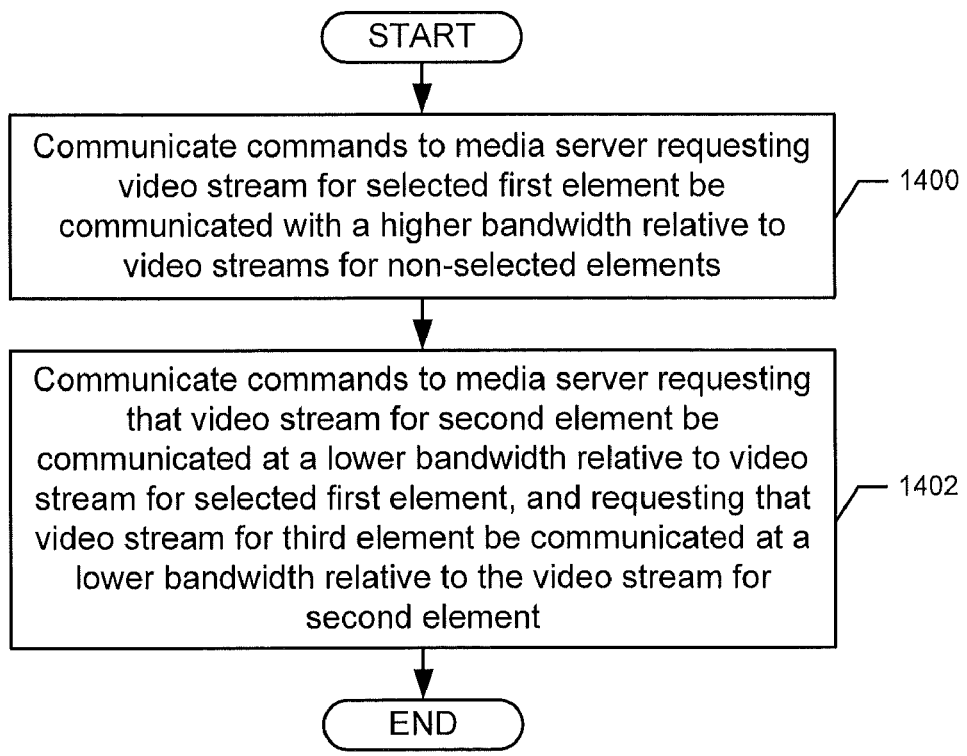

FIG. 14 illustrates a further method that may be carried out when communicating the commands in blocks 1300 and 1302 of FIG. 13. Referring to FIG. 14, the communicated commands may request (block 1400) that a video stream associated with a second element, which is immediately adjacent to the selected first element, be communicated at a lower bandwidth relative to the video stream associated with the selected first element. The commands can further request (block 1402) that a video stream associated with a third element, which is on an opposite side of the second element from the selected first element, be communicated at a lower bandwidth relative to the video stream associated with the second element.

Figure 15:
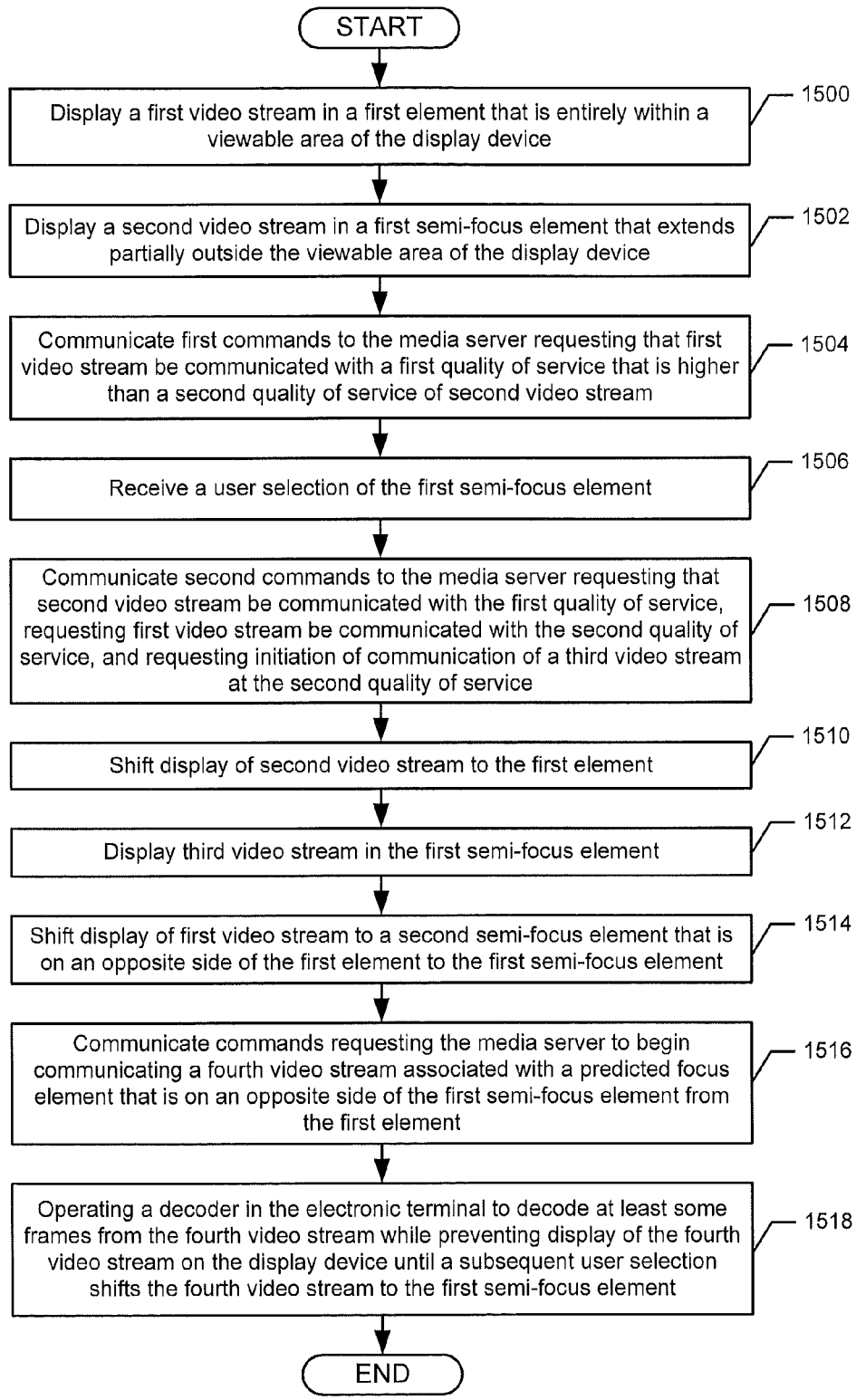

FIG. 15 illustrates a further method that may be carried out in combination with the method of FIG. 12. The method of FIG. 15 may, for example, be carried out to perform the various operations explained above regarding FIGS. 1-4. Referring to FIG. 15, a first video stream (e.g., stream D in FIG. 1) from the media server 210 is displayed (block 1500) in a first element (e.g., selected focus element of FIG. 1) that is entirely within a viewable area of the display device 102. A second video stream (e.g., stream E of FIG. 1) from the media server 210 is displayed (block 1502) in a first semi-focus element (e.g., a semi-focus element of FIG. 1) that extends partially outside the viewable area of the display device 102. First commands are communicated (block 1504) to the media server 210 requesting that the first video stream (e.g., stream D in FIG. 1) be communicated with a first quality of service that is higher than a second quality of service at which the second video stream (e.g., stream E in FIG. 1) is communicated to the electronic terminal 100.

A user selection of the first semi-focus element (e.g., semi-focus element E of FIG. 1) is received (block 1506), such as by a user touch section of the first semi-focus element or user sliding the elements to the left on the display 100. Second commands are communicated (block 1508) to the media server 210 requesting that the second video stream (e.g., stream E in FIG. 1) be communicated with the first quality of service, requesting that the first video stream (e.g., stream D in FIG. 1) be communicated with the second quality of service, and requesting initiation of communication of a third video stream (e.g., stream F in FIG. 1) from the media server 210 to the electronic terminal 100 at the second quality of service. Display of the second video stream (e.g., stream E in FIG. 1) is shifted (block 1510) to the first element (e.g., selected focus element of FIG. 4). The third video stream (e.g., stream F in FIGS. 1 and 4) is displayed (block 1512) in the first semi-focus element (e.g., a semi-focus element of FIG. 4). Display of the first video stream (e.g., stream D in FIG. 1) is shifted (block 1514) to a second semi-focus element (e.g., another semi-focus element of FIG. 4) that is on an opposite side of the first element (e.g., selected focus element of FIG. 4) to the first semi-focus element.

Commands are communicated (block 1516) to the media server 210, responsive to the user selection of the first semi-focus element, requesting the media server 210 to begin communicating a fourth video stream (e.g., stream G in FIG. 4) associated with a predicted focus element (e.g., predicted focus element of FIG. 4) that is on an opposite side of the first semi-focus element from the first element. The decoder 510 in the electronic terminal 100 is operated (block 1518) to decode at least some frames from the fourth video stream (e.g., stream G in FIG. 4) while preventing display of the fourth video stream on the display device 102 until a subsequent user selection shifts the fourth video stream to the first semi-focus element. The decoder 510 is thereby initialized so that its video output can be more immediately switched over to be displayed on the display 102.

Figure 16:
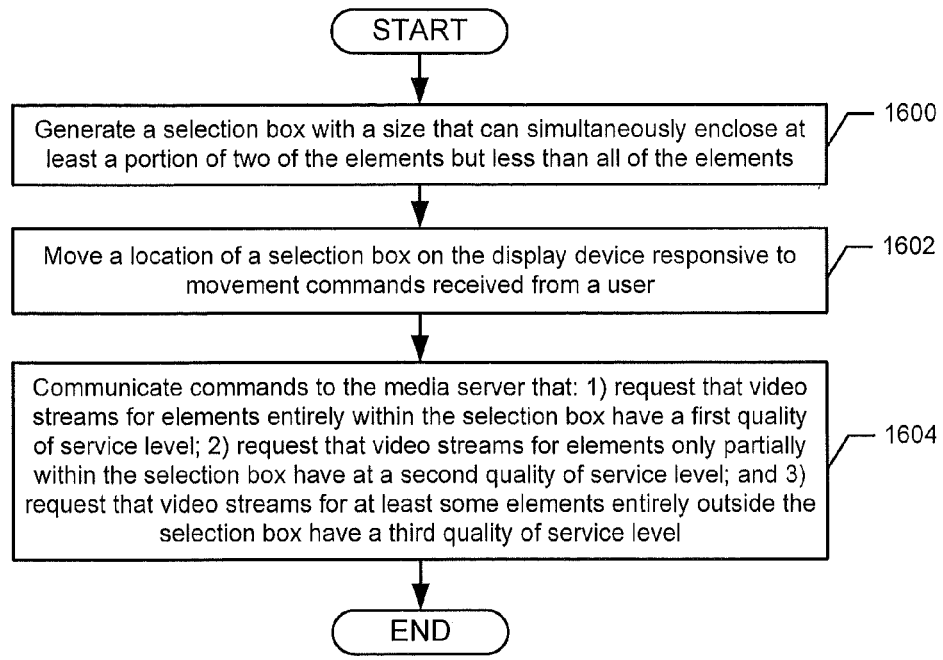

FIG. 16 illustrates a further method that may be carried out in combination with the method of FIG. 12. The method of FIG. 16 may, for example, be carried out to perform the various operations explained above regarding FIGS. 7 and 8. Referring to FIG. 16, a selection box (e.g., selection box 700 in FIGS. 7 and 8) is generated (block 1600) with a size that can simultaneously enclose at least a portion of two of the elements but less than all of the elements. A location of the selection box is moved (block 1602) on the display device 102 responsive to movement commands received from a user. The selection box may or may not be viewable by a user on the display 102. Movement commands may be received as touch commands on the display device 102 and/or may be received through another user interface 1050 of the electronic device 100. Responsive to movement of the selection box, commands are communicated (block 1706) to the media server 210 that: request that video streams associated with elements that are entirely within the selection box be communicated at a first quality of service level; request that video streams associated with elements that are only partially within the selection box be communicated at a second quality of service level; and request that video streams associated with at least some elements that are entirely outside the selection box be communicated at a third quality of service level. The second quality of service level is less than the first quality of service level and greater than the third quality of service level.

Figure 17:
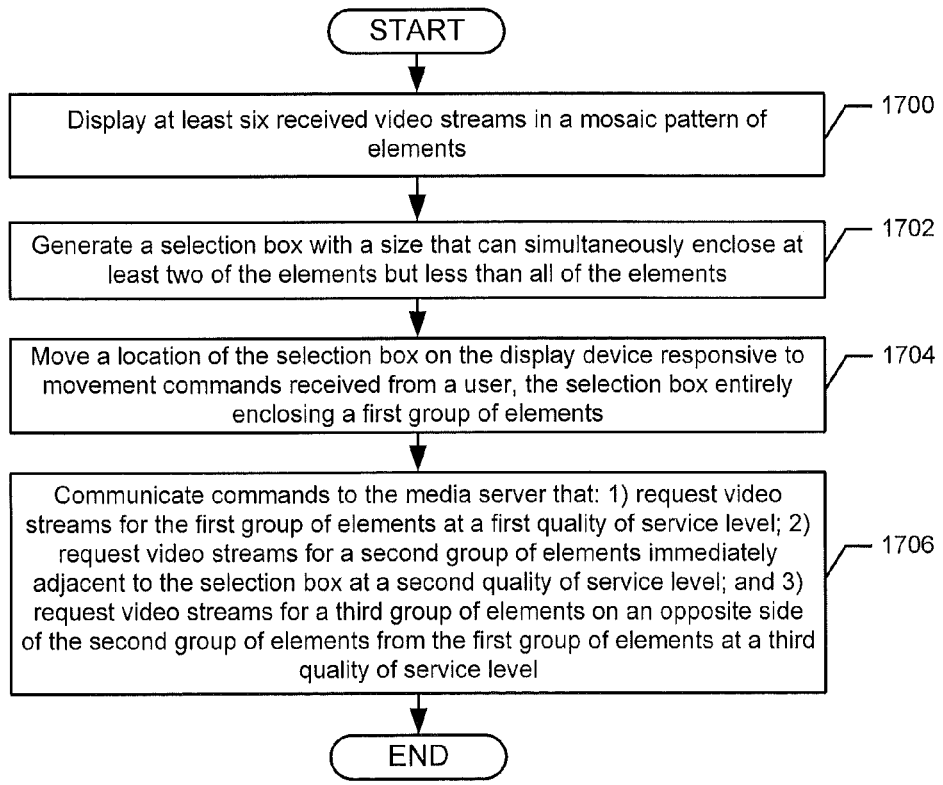

FIG. 17 illustrates a further method that may be carried out in combination with the method of FIG. 12. The method of FIG. 17 may, for example, be carried out to perform the various operations explained above regarding FIGS. 7 and 8. Referring to FIG. 17, at least six received video streams are displayed (1700) in a mosaic pattern of the elements on the display device 102. A selection box (e.g., selection box 700 in FIGS. 7 and 8) is generated (1702) with a size that can simultaneously enclose at least two elements but less than all of the elements. A location of the selection box is moved (block 1704) on the display device 102 responsive to movement commands received from a user. The selection box may or may not be viewable by a user on the display 102. Movement commands may be received as touch commands on the display device 102 and/or may be received through another user interface 1050 of the electronic device 100.

Responsive to movement of the selection box and the selection box entirely enclosing a first group of elements, commands are communicated (block 1706) to the media server 210 that: request that video streams associated with the first group of elements be communicated at a first quality of service level; request that video streams associated with a second group of elements that are immediately adjacent to the selection box be communicated at a second quality of service level; and request that that video streams associated with a third group of elements that are on an opposite side of the second group of elements from the first group of elements be communicated at a third quality of service level. The second quality of service level is less than the first quality of service level and greater than the third quality of service level.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method for controlling display of video streams on an electronic terminal, the method comprising:
receiving a plurality of the video streams at the electronic terminal from a media server;
displaying the received video streams in an ordered set of elements on a display device of the electronic terminal;
receiving a user selection of at least a first one of the elements; and
communicating commands from the electronic terminal to the media server, responsive to the user selection, that control quality of service of the video streams that are received and displayed in each of the non-selected elements responsive to their respective location within the ordered set of elements relative to the selected first element, wherein the commands communicated to the media server request that a video stream associated with a second element, which is immediately adjacent to the selected first element, be communicated at a lower bandwidth relative to the video stream associated with the selected first element, and further request that a video stream associated with a third element, which is on an opposite side of the second element from the selected first element, be communicated at a lower bandwidth relative to the video stream associated with the second element.

2. A method for controlling display of video streams on an electronic terminal, the method comprising:
receiving a plurality of the video streams at the electronic terminal from a media server;
displaying the received video streams in an ordered set of elements on a display device of the electronic terminal;
receiving a user selection of at least a first one of the elements; and
communicating commands from the electronic terminal to the media server, responsive to the user selection, that control quality of service of the video streams that are received and displayed in each of the non-selected elements responsive to their respective location within the ordered set of elements relative to the selected first element,
wherein communicating commands to the media server that control quality of service of the video streams comprises:
communicating commands to the media server requesting that the video stream associated with the selected first element be communicated with a greater number of lines per video frame, a greater video frame rate, a higher quality video coding algorithm, and/or higher quality video coding parameter settings relative to a number of lines per video frame, a video frame rate, a quality of video coding algorithm, and/or a quality of video coding parameter settings that are used to communicate video streams for at least some of the non-selected elements to the electronic terminal.

3. A method for controlling display of video streams on an electronic terminal, the method comprising:
receiving a plurality of the video streams at the electronic terminal from a media server;
displaying the received video streams in an ordered set of elements on a display device of the electronic terminal;
receiving a user selection of at least a first one of the elements;
communicating commands from the electronic terminal to the media server, responsive to the user selection, that control quality of service of the video streams that are received and displayed in each of the non-selected elements responsive to their respective location within the ordered set of elements relative to the selected first element;
receiving a user selection of at least a second one of the elements;
communicating commands to the media server requesting that the quality of service at which the video stream associated with the previously selected first element be decreased to a level of at least some of the non-selected elements and requesting that the quality of service at which the video stream associated with the selected second element be increased above the decreased quality of service of the video stream associated with the previously selected first element.

4. A method for controlling display of video streams on an electronic terminal, the method comprising:
receiving a plurality of the video streams at the electronic terminal from a media server;
displaying the received video streams in an ordered set of elements on a display device of the electronic terminal;
receiving a user selection of at least a first one of the elements;
communicating commands from the electronic terminal to the media server, responsive to the user selection, that control quality of service of the video streams that are received and displayed in each of the non-selected elements responsive to their respective location within the ordered set of elements relative to the selected first element;
displaying a first video stream from the media server in the first element that is entirely within a viewable area of the display device;

displaying a second video stream from the media server in a first semi-focus element that extends partially outside the viewable area of the display device and is adjacent to the first element;

communicating first commands to the media server requesting that the first video stream be communicated with a first quality of service that is higher than a second quality of service at which the second video stream is communicated to the electronic terminal receiving a user selection of the first semi-focus element;

communicating second commands to the media server requesting that the second video stream be communicated with the first quality of service, requesting that the first video stream be communicated with the second quality of service, and requesting initiation of communication of a third video stream from the media server to the electronic terminal at the second quality of service;

shifting display of the second video stream to the first element;

displaying the third video stream in the first semi-focus element; and shifting display of the first video stream to a second semi-focus element that is on an opposite side of the first element to the first semi-focus element.

5. The method of claim 4, further comprising:

communicating commands to the media server, responsive to the user selection of the first semi-focus element, requesting the media server to begin communicating a fourth video stream associated with a predicted focus element that is on an opposite side of the first semi-focus element from the first element; and operating a decoder in the electronic terminal to decode at least some frames from the fourth video stream while preventing display of the fourth video stream on the display device until a subsequent user selection shifts the fourth video stream to the first semi-focus element.

6. A method for controlling display of video streams on an electronic terminal, the method comprising:

receiving a plurality of the video streams at the electronic terminal from a media server:

displaying the received video streams in an ordered set of elements on a display device of the electronic terminal;

receiving a user selection of at least a first one of the elements;

communicating commands from the electronic terminal to the media server, responsive to the user selection, that control quality of service of the video streams that are received and displayed in each of the non-selected elements responsive to their respective location within the ordered set of elements relative to the selected first element;

generating a selection box with a size that can simultaneously enclose at least a portion of two of the elements but less than all of the elements;

moving a location of the selection box on the display device responsive to movement commands received from a user; and communicating commands to the media server, responsive to movement of the selection box, that:

request that video streams associated with elements that are entirely within the selection box be communicated at a first quality of service level, request that video streams associated with elements that are only partially within the selection box be communicated at a second quality of service level, and request that video streams associated with at least some elements that are entirely outside the selection box be communicated at a third quality of service level, wherein the second quality of service level is less than the first quality of service level and greater than the third quality of service level.

7. A method for controlling display of video streams on an electronic terminal, the method comprising:

receiving a plurality of the video streams at the electronic terminal from a media server;

displaying the received video streams in an ordered set of elements on a display device of the electronic terminal;

receiving a user selection of at least a first one of the elements;

communicating commands from the electronic terminal to the media server, responsive to the user selection, that control quality of service of the video streams that are received and displayed in each of the non-selected elements responsive to their respective location within the ordered set of elements relative to the selected first element;

displaying at least six received video streams in a mosaic pattern of the elements on the display device;

generating a selection box with a size that can simultaneously enclose at least two elements but less than all of the elements;

moving a location of a selection box on the display device responsive to movement commands received from a user; and responsive to the selection box entirely enclosing a first group of elements, communicating commands to the media server that:

request that video streams associated with the first group of elements be communicated at a first quality of service level, request that video streams associated with a second group of elements that are immediately adjacent to the selection box be communicated at a second quality of service level, and request that that video streams associated with a third group of elements that are on an opposite side of the second group of elements from the first group of elements be communicated at a third quality of service level, wherein the second quality of service level is less than the first quality of service level and greater than the third quality of service level.

8. An electronic terminal that displays video streams received from a media server, the electronic terminal comprising:

transceiver circuitry;

a display device; and circuitry that is configured to:

receive a plurality of the video streams from a media server via the transceiver circuitry;

display the received video streams in an ordered set of elements on the display device;

receive a user selection of at least a first one of the elements; and communicate commands to the media server via the transceiver circuitry, responsive to the user selection, that control quality of service of the video streams that are displayed in each of the non-selected elements responsive to their respective location within the ordered set of elements relative to the selected first element, wherein the commands communicated to the media server request that a video stream associated with a second element, which is immediately adjacent to the selected first element, be communicated at a lower bandwidth relative to the video stream associated with the selected first element, and further request that a video stream associated with a third element, which is on an opposite side of the second element from the selected first element, be communicated at a lower bandwidth relative to the video stream associated with the second element.

9. An electronic terminal that displays video streams received from a media server, the electronic terminal comprising:
  transceiver circuitry;
  a display device; and
  circuitry that is configured to:
    receive a plurality of the video streams from a media server via the transceiver circuitry;
    display the received video streams in an ordered set of elements on the display device;
    receive a user selection of at least a first one of the elements; and
    communicate commands to the media server via the transceiver circuitry, responsive to the user selection, that control quality of service of the video streams that are displayed in each of the non-selected elements responsive to their respective location within the ordered set of elements relative to the selected first element, wherein the commands communicated to the media server request that the video stream associated with the selected first element be communicated with a greater number of lines per video frame, a greater video frame rate, a higher quality video coding algorithm, and/or higher quality video coding parameter settings relative to a number of lines per video frame, a video frame rate, a quality of video coding algorithm, and/or a quality of video coding parameter settings that are used to communicate video streams for at least some of the non-selected elements to the electronic terminal.

10. An electronic terminal that displays video streams received from a media server, the electronic terminal comprising:
  transceiver circuitry;
  a display device; and
  circuitry that is configured to:
    receive a plurality of the video streams from a media server via the transceiver circuitry;
    display the received video streams in an ordered set of elements on the display device;
    receive a user selection of at least a first one of the elements;
    communicate commands to the media server via the transceiver circuitry, responsive to the user selection, that control quality of service of the video streams that are displayed in each of the non-selected elements responsive to their respective location within the ordered set of elements relative to the selected first element, wherein the commands communicated to the media server request;
    display a first video stream from the media server in a focus element that is entirely within a viewable area of the display device;
    display a second video stream from the media server in a first semi-focus element that extends partially outside the viewable area of the display device;
    communicate first commands to the media server requesting that the first video stream be communicated with a first quality of service that is higher than a second quality of service at which the second video stream is communicated to the electronic terminal;
    sense a user selection of the first semi-focus element;
    communicate second commands to the media server, responsive to the user selection of the first semi-focus element, that:
      request that the second video stream be communicated with the first quality of service,
      request that the first video stream be communicated with the second quality of service, and
      request initiation of communication of a third video stream from the media server to the electronic terminal at the second quality of service;
    shift display of the second video stream to the focus element;
    display the third video stream in the first semi-focus element; and
    shift display of the first video stream to a second semi-focus element that is on an opposite side of the focus element to the first semi-focus element.

11. The electronic terminal of claim 10, wherein the circuitry is further configured to:
  communicate commands to the media server, responsive to the user selection of the first semi-focus element, requesting the media server to begin communicating a fourth video stream associated with a predicted focus element that is on an opposite side of the first semi-focus element from the focus element; and
  operate a decoder in the electronic terminal to decode at least some frames from the fourth video stream while preventing display of the fourth video stream on the display device until a subsequent user selection shifts the fourth video stream to the first semi-focus element.

12. An electronic terminal that displays video streams received from a media server, the electronic terminal comprising:
  transceiver circuitry;
  a display device; and
  circuitry that is configured to:
    receive a plurality of the video streams from a media server via the transceiver circuitry;
    display the received video streams in an ordered set of elements on the display device;
    receive a user selection of at least a first one of the elements;
    communicate commands to the media server via the transceiver circuitry, responsive to the user selection, that control quality of service of the video streams that are displayed in each of the non-selected elements responsive to their respective location within the ordered set of elements relative to the selected first element, wherein the commands communicated to the media server request;
    generate a selection box with a size that can simultaneously enclose at least a portion of two of the elements but less than all of the elements;
    move a location of the selection box on the display device responsive to movement commands received from a user; and
    communicate commands to the media server, responsive to movement of the selection box, that:
      request that video streams associated with elements that are entirely within the selection box be communicated at a first quality of service level, request that video streams associated with elements that are only partially within the selection box be communicated at a second quality of service level, and request that video streams associated with at least some elements that are entirely outside the selection box be communicated at a third quality of service level, wherein the second quality of service level is less than the first quality of service level and greater than the third quality of service level.

13. An electronic terminal that displays video streams received from a media server, the electronic terminal comprising:

transceiver circuitry;

a display device; and circuitry that is configured to:

receive a plurality of the video streams from a media server via the transceiver circuitry;

display the received video streams in an ordered set of elements on the display device;

receive a user selection of at least a first one of the elements;

communicate commands to the media server via the transceiver circuitry, responsive to the user selection, that control quality of service of the video streams that are displayed in each of the non-selected elements responsive to their respective location within the ordered set of elements relative to the selected first element, wherein the commands communicated to the media server request;

display at least six received video streams in a mosaic pattern of the elements on the display device;

generate a selection box with a size that can simultaneously enclose at least two elements but less than all of the elements;

move a location of the selection box on the display device responsive to movement commands received from a user; and responsive to the selection box entirely enclosing a first group of elements, communicate commands to the media server that:

request that video streams associated with the first group of elements be communicated at a first quality of service level, request that video streams associated with a second group of elements that are immediately adjacent to the selection box be communicated at a second quality of service level, and request that that video streams associated with a third group of elements that are on an opposite side of the second group of elements from the first group of elements be communicated at a third quality of service level, wherein the second quality of service level is less than the first quality of service level and greater than the third quality of service level.

14. A video distribution system comprising:

a media server that outputs a plurality of video streams at quality of service levels that are controlled in response to received commands; and at least one electronic terminal comprising:

transceiver circuitry;

a display device; and circuitry that is configured to:

receive a plurality of the video streams from the media server via the transceiver circuitry;

display the received video streams in an ordered set of elements on the display device;

receive a user selection of at least a first one of the elements;

communicate commands to the media server via the transceiver circuitry, responsive to the user selection, that control quality of service of the video streams that are displayed in each of the non-selected elements responsive to their respective location within the ordered set of elements relative to the selected first element;

generate a selection box with a size that can simultaneously enclose at least two elements but less than all of the elements;

move a location of a selection box on the display device responsive to movement commands received from a user; and responsive to the selection box entirely enclosing a first group of elements, communicate commands to the media server that:

request that video streams associated with the first group of elements be communicated at a first quality of service level, request that video streams associated with a second group of elements that are immediately adjacent to the selection box be communicated at a second quality of service level, and request that that video streams associated with a third group of elements that are on an opposite side of the second group of elements from the first group of elements be communicated at a third quality of service level, wherein the second quality of service level is less than the first quality of service level and greater than the third quality of service level.

* * * * *

UNITED STATES PATENT AND TRADEMARK OFFICE
CERTIFICATE OF CORRECTION

Page 1 of 2

PATENT NO. : 8,412,842 B2
APPLICATION NO. : 12/973590
DATED : April 2, 2013
INVENTOR(S) : Andersson et al.

It is certified that error appears in the above-identified patent and that said Letters Patent is hereby corrected as shown below:

In the Drawings

In Fig. 11, Sheet 6 of 10, delete "Media Repository 922" and insert -- Media Repository 924 --, therefor.

In Fig. 16, Sheet 10 of 10, for Tag "1604", in Line 4, delete "have at a" and insert -- have a --, therefor.

In the Specifications

In Column 6, Line 17, delete "steams," and insert -- streams, --, therefor.

In Column 6, Line 18, delete "steams," and insert -- streams, --, therefor.

In Column 7, Line 29, delete "video steam" and insert -- video stream --, therefor.

In Column 7, Line 31, delete "video steam" and insert -- video stream --, therefor.

In Column 7, Line 33, delete "video steam" and insert -- video stream --, therefor.

In Column 12, Line 13, delete "display 100." and insert -- display 102. --, therefor.

In Column 12, Line 51, delete "selection box 700" and insert -- selection box 710 --, therefor.

In Column 12, Line 62, delete "1706)" and insert -- 1604) --, therefor.

In Column 13, Line 12, delete "selection box 700" and insert -- selection box 710 --, therefor.

Signed and Sealed this
Fourth Day of February, 2014

Michelle K. Lee
*Deputy Director of the United States Patent and Trademark Office*

In Column 13, Line 31, delete "that that" and insert -- that --, therefor.

In the Claims

In Column 17, Line 9, in Claim 4, delete "terminal" and insert -- terminal; --, therefor.

In Column 17, Line 42, in Claim 6, delete "server:" and insert -- server; --, therefor.

In Column 18, Line 40, in Claim 7, delete "that that" and insert -- that --, therefor.

In Column 21, Line 51, in Claim 13, delete "that that" and insert -- that --, therefor.

In Column 22, Line 43, in Claim 14, delete "that that" and insert -- that --, therefor.